Patented Nov. 17, 1936

2,061,243

UNITED STATES PATENT OFFICE 2,061,243

UNSYMMETRICAL FLUORO-PHENYL-THIO-UREAS AND PROCESS OF PREPARING SAME

Herbert A. Lubs and Arthur L. Fox, Wilmington, Del., assignors to E. I. du Pont de Nemours & Company, Wilmington, Del., a corporation of Delaware No Drawing. Application August 24, 1932, Serial No. 630,248

10 Claims. (Cl. 260—125)

This invention relates to the manufacture of new chemical compounds useful as intermediates in the production of dyestuffs and other products of a useful nature.

An object of the present invention is to produce new chemical compounds and more particularly new aryl thioureas. Further objects are to provide a method for producing such new compounds. Other and further objects are to provide new compositions of matter and to advance the art. Other objects will appear hereinafter.

These objects may be accomplished according to our invention which comprises reacting p-fluoraniline with substances such as thiocyanates, isothiocyanates, and carbon bisulfide, whereupon para-fluoro-phenyl-thioureas are produced. These para-fluoro-phenyl-thioureas are new chemical compounds which have not been produced heretofore and are valuable for use as intermediates in the manufacture of new dyestuffs and other products.

The compounds forming the subject matter of our invention may be represented by the formula:

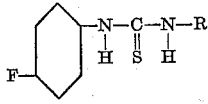

in which R may represent hydrogen or an aryl or alkyl radical. Some of these new compounds which we have found to be particularly valuable are as follows:

p-fluoro-phenyl-thiourea

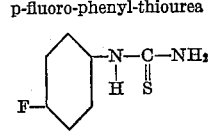

phenyl-p-fluoro-phenyl-thiourea

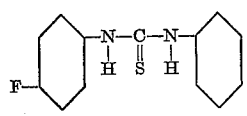

Symmetrical di-fluoro-diphenyl-thiourea

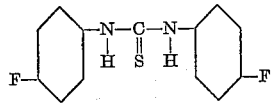

In order to more clearly illustrate our invention and the preferred mode of carrying the same into effect, the following examples are given:

*Example 1.*—p-fluoro-phenyl-thiourea is prepared by mixing:

44 gms. p-fluoraniline
170 cc. $H_2O$
35 cc. HCl (conc.)
36 gms. ammonium thiocyanate The resulting mixture is refluxed with stirring for 5 hours and then allowed to cool. The white crystalline product is then filtered off and dried. The yield was 50 grams. The para-fluoro-phenyl-thiourea thus prepared melts within the range of 163–4° C.

*Example 2.*—Phenyl-fluoro-phenyl-thiourea may be obtained by mixing:

7 gms. phenyl isothiocyanate
25 cc. alcohol
5.5 gms. p-fluoraniline

This mixture was allowed to stand for one hour. Crystallization of the product started within the first few minutes. The product was filtered off and dried, with a yield of 11.4 grams. Phenyl-fluoro-phenyl-thiourea melts within the range of 174.5–175.5° C.

*Example 3.*—Symmetrical di-fluoro-diphenyl-thiourea may be obtained by mixing:

25 gms. p-fluoraniline
25 cc. alcohol
25 gms. $CS_2$
.2 gm. sulfur

This mixture was refluxed for 6 hours after which the product was filtered off and dried. A yield of 26 grams was thus obtained. Symmetrical di-fluoro-diphenyl-thiourea melts within the range of 186.5–188° C.

The p:p'difluoro-diphenyl-thiourea may be prepared by the process of Example 2, if desired, by the substitution of p-fluoro-phenyl-isothiocyanate for the phenyl-isothiocyanate.

Other derivatives of para-fluoro-phenyl-thiourea may also be obtained in accordance with the process of Example 2, by substituting other isothiocyanates for the phenyl-isothiocyanate. In this way, various alkyl, aryl, and like derivatives of the fluoro-phenyl-thiourea may be obtained by the use of the appropriate isothiocyanate. Some of the other isothiocyanates which may be employed satisfactorily are 4-methyl-phenyl-isothiocyanate, 4-ethyl-phenyl-isothiocyanate, 4-methoxy-phenyl-isothiocyanate, 4-ethoxy-phenyl-isothiocyanate, 4-chloro-phenyl-isothiocyanate, naphthyl-isothiocyanate, methyl-isothiocyanate, ethyl-isothiocyanate, and butylisothiocyanate, with the production of the corresponding derivatives of para-fluoro-phenyl-thiourea.

The process of Example 1 may also be varied by the use of other thiocyanates such as thiocyanates of the other alkali metals, such as sodium and potassium and other metals.

The term "alkali metal" as herein employed is intended to include ammonium compounds.

While we have disclosed certain compounds of our class and specific methods of preparing the same, it will be apparent to those skilled in the art that many other compounds falling within our class may be likewise produced and that the methods of preparing the same may be widely varied without departing from the spirit of our invention. Accordingly, the scope of our invention is to be limited solely by the appended claims construed as broadly as is permissible in view of the prior art.

We claim:

1. The process of preparing p-fluoro-phenyl-thioureas which comprises reacting p-fluoro-aniline with a member of the group consisting of alkali metal thiocyanates and lower alkyl and aryl isothiocyanates of the benzene and naphthalene series.

2. The process of preparing p-fluoro-phenyl-thiourea which comprises reacting p-fluoro-aniline with an alkali metal thiocyanate.

3. The process of preparing p-fluoro-phenyl-thiourea which comprises reacting p-fluoro-aniline with ammonium thiocyanate.

4. The process of preparing p-fluoro-phenyl-thiourea which comprises reacting p-fluoro-aniline with an alkali metal thiocyanate in the presence of water and acid which is non-oxidizing under the conditions of reaction.

5. The process of preparing p-fluoro-phenyl-thioureas which comprises reacting p-fluoro-aniline with an aryl isothiocyanate of the benzene or naphthalene series.

6. The process of preparing p-fluoro-phenyl-thioureas which comprises reacting p-fluoro-aniline with a phenyl-isothiocyanate.

7. The process of preparing p,p'-difluoro-diphenyl-thiourea which comprises reacting p-fluoro-aniline with p-fluoro-phenyl isothiocyanate.

8. A compound having the formula:

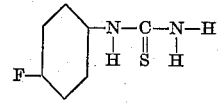

9. A compound having the formula:

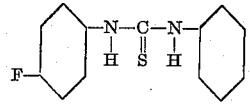

10. Unsymmetrical compounds of the type:

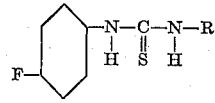

wherein R represents a member of the group consisting of hydrogen, lower alkyl and aromatic radicals of the benzene and naphthalene series.

HERBERT A. LUBS.
ARTHUR L. FOX.